No. 815,051. PATENTED MAR. 13, 1906.
J. VORBACH.
POTATO DIGGER.
APPLICATION FILED SEPT. 17, 1903.
2 SHEETS—SHEET 1.
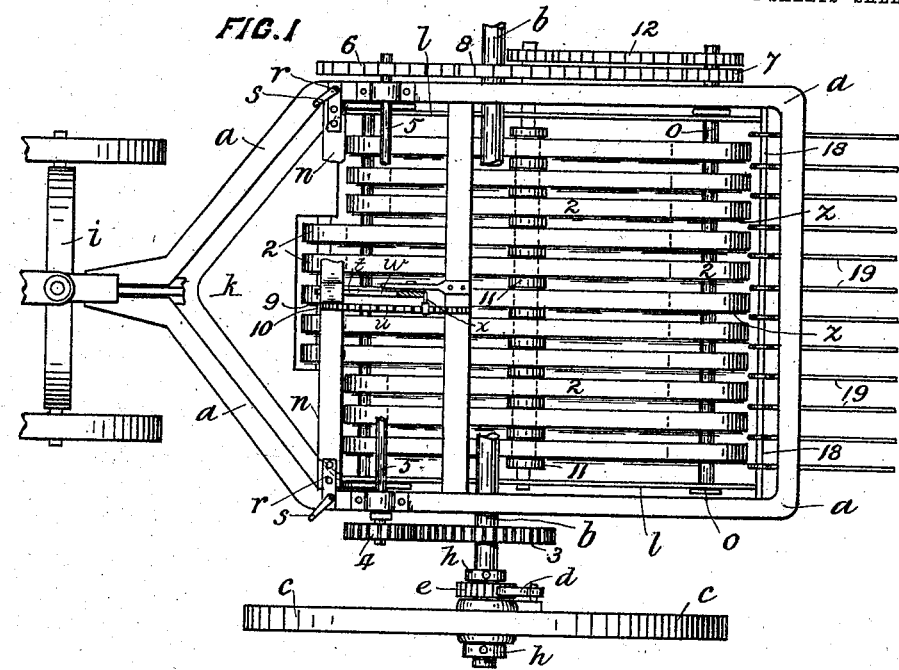
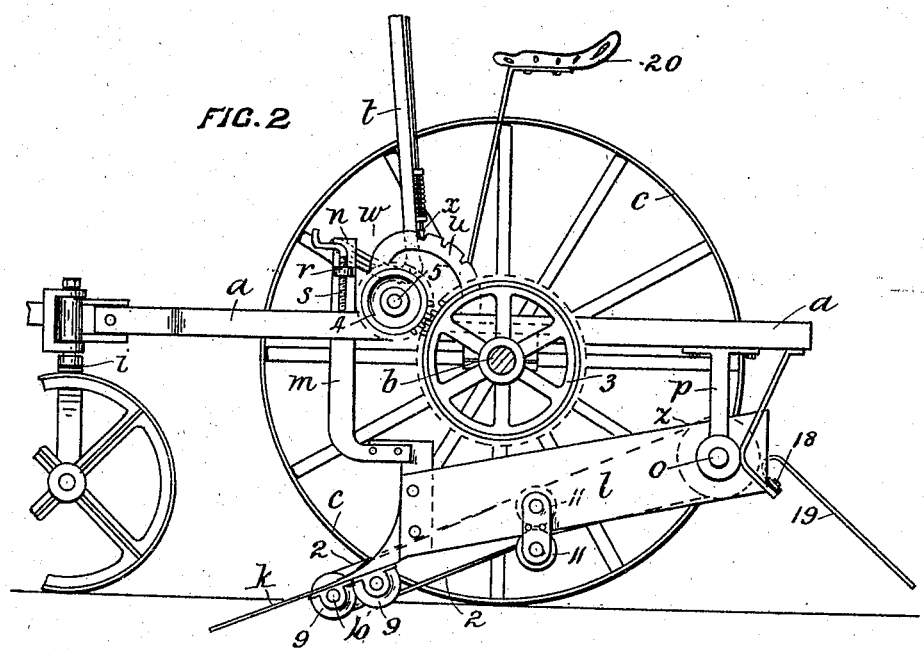
Witnesses
George G. Schoenlank
Thomas Kirkpatrick
Inventor
John Vorbach
by H. van Oedenneer
attorney

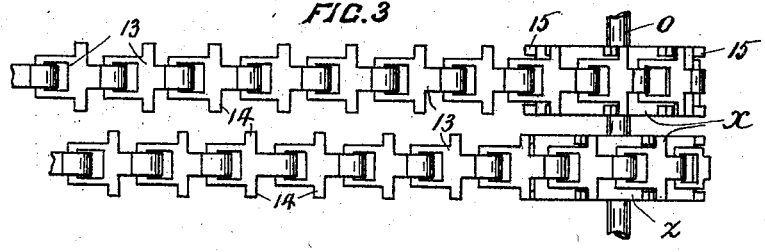
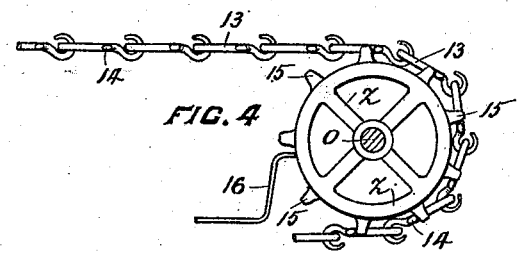
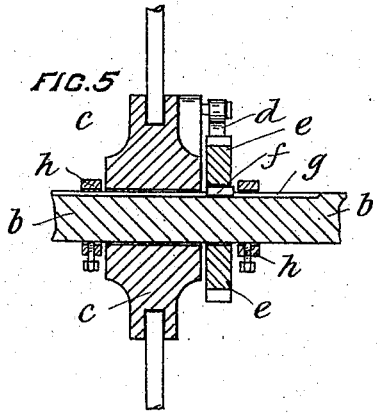
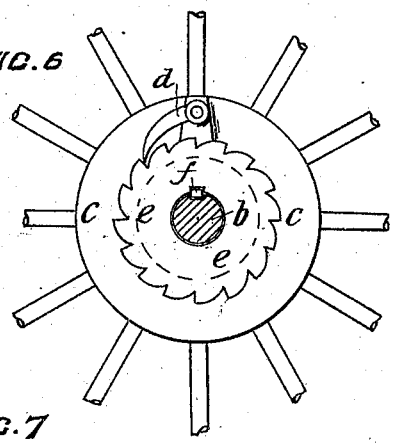
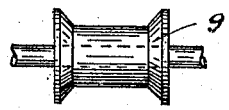

UNITED STATES PATENT OFFICE.

JOHN VORBACH, OF RENWICKTOWN, NEW ZEALAND.

POTATO-DIGGER.

No. 815,051.             Specification of Letters Patent.             Patented March 13, 1906.

Application filed September 17, 1903. Serial No. 173,598.

*To all whom it may concern:*

Be it known that I, JOHN VORBACH, a subject of the King of Great Britain, residing at Renwicktown, Marlborough, in the Colony of New Zealand, have invented a new and useful Improved Potato-Digger; and I do hereby declare the following to be a full, clear, and exact description of the same.

This invention relates to an improved machine for digging potatoes out of the ground, separating the earth therefrom, and delivering the potatoes upon the surface of the ground at the rear of the machine.

The machine consists, broadly, of, first, a frame carried upon wheels adjustable in their distance apart; second, a share or scoop supported upon the frame and adjustable in depth, so as to dig to varying depths; third, an endless traveling grating or riddle, the front and bottom end of which extends to within a short distance of the edge of the share or scoop and the top or back end of which extends to the rear of the machine, and, fourth, a fixed grating at the rear of the traveling grating and extending rearward from the back end of the machine.

In describing the invention reference will be made to the accompanying sheets of drawings, in which—

Figure 1 is a plan of the machine, a portion of the frame being broken away in order to clearly show the traveling grating or riddle. Fig. 2 is a side elevation of the machine, the near wheel being removed therefrom. Fig. 3 is a detail plan view of portion of the traveling grating. Fig. 4 is a side elevation of the same. Fig. 5 is a cross-section of the nave of one of the carrying-wheels, showing its special form of construction for enabling the wheel to be moved along its shaft. Fig. 6 is an inside elevation of the same. Fig. 7 is a plan of the form of roller employed for carrying the traveling grating.

$a$ is the frame, which is mounted upon an axle-shaft $b$, carried by suitable bearings. The driving-wheels $c$ are freely mounted upon each end of the axle. Each of these wheels has secured upon the inside face of its nave a pawl $d$, which is adapted to gear with the teeth of a ratchet-wheel $e$, mounted upon the axle $b$. This ratchet-wheel is provided with a feather-key $f$, Figs. 5 and 6, fitting in a keyway $g$, extending along the axle and by means of which the ratchet-wheel is locked to the axle. As the wheels $c$ revolve in the forward direction the pawls $d$ will engage with the ratchet-wheel $e$, and thus cause them and the axle $b$ to turn with the wheels; but this arrangement of appliances will allow of the wheels running freely upon the axle when the machine is being moved backward. The wheels are kept from moving along the axle by means of the collars $h$, secured upon each side of them. By shifting these collars in either direction the wheels $c$ may be moved along the axle either toward or from each other, and thus adapt the machine for working in any width of furrow.

The front part of the frame $a$ is carried by the fore carriage $i$, to which the draft-pole is secured.

$k$ is the share or scoop, which is made, preferably, of the form shown in the drawings, but which may be made of any other approved design. The back end of the share or scoop is provided with side wings or plates $l$, which are secured at their front ends to depending straps $m$ of a cross-piece $n$, extending across the machine above the frame $a$. The back ends of the wings or plates $l$ are carried upon a spindle $o$, that is supported in bearings $p$, depending from each side of the frame $a$. The cross-piece $n$ is provided with a boss projection $r$ at each end, through which are threaded pins $s$, the bottom ends of which rest upon the side pieces of the frame $a$, and thus serve to support the cross-piece $n$ and the depending front of the scoop-wings. By screwing these pins $s$ down or up through their bosses the height of the cross-piece $n$ may be raised or lowered and the consequent position of the scoop-point adjusted with relation to the machine, thereby regulating the depth to which the scoop or share will dig.

A lever $t$ is pivoted within a frame $u$ upon the top of the machine-frame $a$. This lever is provided with an arm $w$, that extends forward and is pivotally secured to the center of the cross-piece $n$. By operating this lever the cross-piece may be raised so as to lift the scoop clear of the ground and allow the machine to travel freely over it, the scoop with its wings turning upon the shaft $o$ as a pivot. The lever $t$ is provided with a spring-catch $x$, by means of which it may be retained in any position so as to fasten the scoop in its raised position.

The traveling grating or riddle is composed of a number of endless traveling chains or belts 2, arranged in parallel lines and extending from near the front end of the scoop $k$ to the rear end of the machine, where they pass over pulleys $z$, mounted rigidly upon the shaft $o$. To this shaft rotatory motion is conveyed by means of the spur-wheel 3, mounted upon the axle $b$, engaging with a pinion 4 upon the end of a counter-shaft 5, carried in bearings across the top of the frame $a$. Upon the other end of this counter-shaft a chain-wheel 6 is secured, and upon the end of the shaft $o$ is secured a corresponding chain-wheel 7, the two wheels being connected together by means of a chain 8. As the axle $b$ is revolved by drawing the machine forward the revolving motion is communicated, through the spur-wheels 3 and 4, to the shaft 5, and from it, per medium of the chain-wheels and chain, to the shaft $o$, which is thus caused to rotate in the opposite direction to the rotation of the axle $b$. The front ends of the chains or bands 2 are carried upon small rollers 9, loosely mounted upon shafts 10, carried in bearings secured upon the under side of the scoop $k$. Supporting-rollers 11 also extend across beneath the machine and serve to prevent the traveling bands from sagging. The top series of these rollers is caused to revolve by means of the chain-belt gearing 12, connecting the shaft $o$ with the roller-spindle. These rollers will therefore aid the traveling bands in their operation. In connection with these bands 2 it is considered preferable that they should be constructed as shown in Figs. 3 and 4, being composed of a number of links 13 of peculiar form, pivotally secured to one another. These links are formed with short projections 14 on each side, with which teeth 15 upon the edges of the peripheries of the pulleys $z$ will engage, and thus in their revolution carry the links round with them. The rollers 9 (shown in detail in Fig. 7) simply act as pulleys to guide the bands on their return journey.

Suitable flat scrapers 16 bear against the peripheries of the pulleys $z$ and serve to keep them clear of dirt, while similar scrapers act in the same manner with the rollers 9.

Secured across the back end of the frame $a$ is a cross-bar 18, to which are securely attached a number of spring-tines 19, which extend backward and downward from the back of the pulleys $z$ beyond the rear of the machine.

The machine is provided with a seat 20, supported upon the frame $a$, for the driver.

The operation of the machine is as follows: The scoop having been adjusted in depth, the machine is drawn along the furrows, when the scoop will dig up the earth and potatoes to the depth to which it has been set. This mixture of earth and potatoes will then be forced up the scoop and by reason of its shape spread across it and be delivered onto the grating, composed by the traveling bands, which is moving in the backward direction. As the earth and potatoes are carried along this grating the earth will be riddled through, leaving the potatoes free. The potatoes will then be carried along to the top end of the gratings, when they will be delivered onto the fixed grating composed by the tines and from that be strewed upon the top surface of the ground, and thus be readily gathered.

What I claim as my invention, and desire to secure by Letters Patent, is—

In a potato-digger, the combination of a main frame, a scoop pivotally hung from the rear part of the said frame, a frame of arch form comprising the depending straps $m$ connected to the front end of the scoop and reaching up within and above the main frame, a hand-lever connected to the said arched frame for adjusting the same, screws located on the outer sides of the depending straps $m$, and arranged to bear on the main frame, the axles and wheels upon which the main frame is supported, pawl-and-ratchet connections between the wheels and axle, a traveling grating associated with the scoop, front and rear rollers around which the traveling grating passes, supporting-rollers for the intermediate part of the said traveling grating and means for driving the rear roller and one of the intermediate supporting-rollers consisting of a cross-shaft 5, geared to the main axle, and sprocket-chain connections between said shaft 5 and the rear shaft of the scoop, and a sprocket-chain connection between the rear roller and the intermediate roller, substantially as described.

In testimony whereof I have signed this specification in the presence of two subscribing witnesses.

JOHN VORBACH.

Witnesses:
W. ALEXANDER,
M. A. MARCHANT.